April 11, 1961     J. M. SCHUTZ     2,979,111
TIRE CONSTRUCTION
Filed July 22, 1954
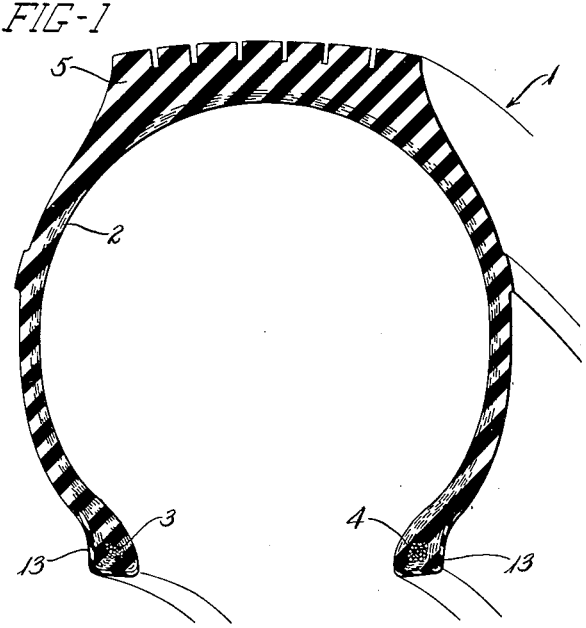
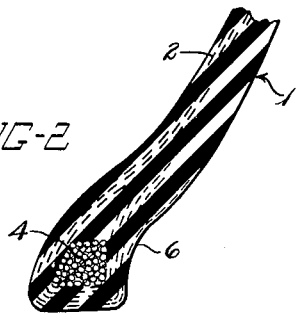
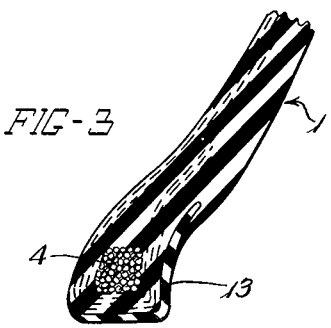
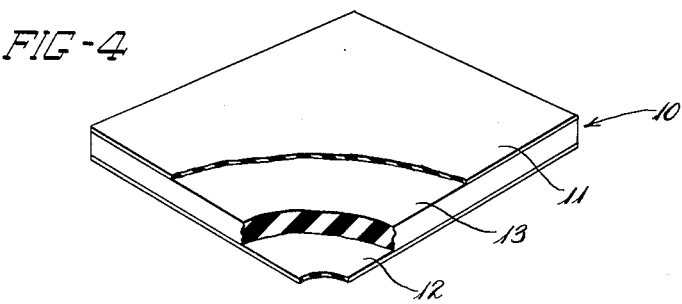
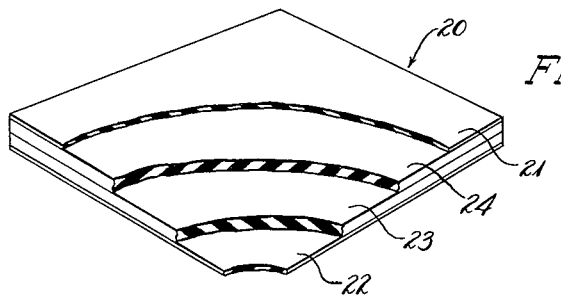
INVENTOR.
JOSEPH M. SCHUTZ
BY W. A. Fraser
ATTY.

United States Patent Office 2,979,111
Patented Apr. 11, 1961

2,979,111

TIRE CONSTRUCTION

Joseph M. Schutz, Akron, Ohio, assignor to The Firestone Tire & Rubber Company, Akron, Ohio, a corporation of Ohio Filed July 22, 1954, Ser. No. 445,115

5 Claims. (Cl. 154—14)

This invention relates to pneumatic tires and more particularly to a protective bead chafer element designed to resist displacement from the bead of the tire during tire vulcanization.

The problem has long existed in the tire building art of providing a rubber covering on the fabric in the bead area of pneumatic tires to protect the bead from rim chafing during road operation of the tire. If the tire bead is covered with sufficient unvulcanized rubber before vulcanization of the tire, the heat and pressure of vulcanization pinches the stock away from its protective position over the fabric of the bead leaving only a very thin veneer of rubber. Many efforts have been made to provide a tire with the protective rubber coating over the chafer area of the bead but for various reasons all attempts have been either too expensive or unsuccessful otherwise.

This problem has been solved in the present invention by the use of a laminated strip of rubber made up of layers of different rubbery stocks having different vulcanization rates so designed that the layers in the center of the strip will stiffen or vulcanize rapidly at low temperatures to provide a precured non-flowable center element having outer tacky surfaces which will not flow from the chafer area of the tire during vulcanization.

It is therefore an object of this invention to provide a rubbery layer of substantial thickness over the rim engaging bead area of a vulcanized tire. A further object of the invention is to provide a laminated rubber chafer strip made up of layers of rubbery stock, each layer having a different vulcanization rate. Another object of the invention is to provide a method of forming a tire bead element protected by a substantial thickness of rubbery material.

These and other objects will become apparent with reference to the specification, claims and drawings of which:

Figure 1 is a fragmentary perspective sectional view of a pneumatic tire showing the chafer element of the invention in a vulcanized tire;

Figure 2 is an enlarged fragmentary sectional view of the bead portion of a pneumatic tire showing the prior art chafer element;

Figure 3 is an enlarged fragmentary sectional view of the bead portion of a pneumatic tire showing the chafer element of the invention;

Figure 4 is a perspective view partially in section of one modification of the rubbery element of the invention;

Figure 5 is a perspective view partially in section of a second modification of the laminated strip used in the invention.

Referring to Figure 1 a vulcanized pneumatic tire generally indicated at 1 is made up of a fabric body portion 2 terminating in two extensible wire bead portions 3 and 4. On the body portion is superimposed by vulcanization a rubbery tread portion 5. Bead portions 3 and 4 comprise bundles of wire assembled in a conventional manner about which the edges of the fabric plies which make up the fabric body portion 2 are folded. To protect the fabric plies adjacent the bead from rubbing of the rim during wheel rotation, it has been the practice before this invention to superimpose on the bead during tire building a square woven fabric chafer strip such as 6, Figure 2, coated with a layer of abrasive-resistant rubber.

However, during vulcanization of the tire, the bead is pinched between the air bag and the tire mold (not shown) with the result that the rubbery coating on fabric chafer 6 on the bead after removal from the mold is insufficient to provide protection from rubbing of the rim during road operation.

In practicing the preferred form of the invention, a laminated strip 10 of unvulcanized rubber (Figure 4) is prepared by calendering or tubing or in any conventional manner. Laminated strip 10 is comprised of two layers of tacky rubbery stock 11 and 12 between which is sandwiched a layer 13 of fast curing rubbery stock. Layer 13 contains vulcanizing materials and accelerators adapted to vulcanize the rubber in layer 13 quickly at a low temperature. The stock in layers 11 and 12 does not contain as much vulcanizing ingredients as layer 13 but contains only sufficient accelerator to allow these layers to retain tack when the center layer 13 is vulcanized thereby permitting the building of the laminated strip into the tire with subsequent vulcanization. To practice the invention, stock 13 is stiffened up either at room temperature or in a hot air atmosphere. Stocks 11 and 12 retain tack and the laminated strip 10 is applied as a chafer strip by adhering the tacky surface of 11 or 12 to the bead portion of the tire. The tire is next vulcanized but because stock 13 has been previously vulcanized, it resists flow and will not pinch away from the bead area under heat and pressure. At the conclusion of the vulcanizing treatment the tire is removed from the vulcanizing mold with the bead area covered by a substantial thickness of rubbery stock 13 as shown in Figure 1.

In another modification of the invention the novel chafer strip is made up of three different stocks calendered into four plies as shown in Figure 5 wherein laminated strip generally shown at 20 is comprised of outer tacky layers 21 and 22 of the same or similar stocks and two plies of two different curing stocks in inner layers 23 and 24. The stocks are mixed and calendered in the conventional manner to form the laminated strip 20. A portion of vulcanizing ingredients from stock 23 is designed to migrate to stock 24 and a portion of vulcanizing ingredients from stock 24 will migrate into stock 23. This combination of accelerators in both stocks triggers the air vulcanization of these layers which set up at a low temperature. The stock in plies 21 and 22 will not be affected by the migration of the accelerators and retains tack for adhering the strip 20 to the bead portion of the unvulcanized tire. In practicing this modification of the invention, a green tire band is built up on a tire building drum in the conventional manner. A strip of laminated rubber 20 is stiffened by heating to cure the two inner layers 23 and 24, but leaving layers 21–22 uncured and tacky. The strip is applied 360° around each bead by adhering the tacky surfaces of 21 to the fabric of the bead. The tire is removed from the drum, formed and vulcanized, but since the stocks in layers 23 and 24 were previously vulcanized and will not flow, the heat and pressure during tire vulcanization will not pinch them away from the bead.

Stocks of the type which will vulcanize at room temperature as well as stocks that will remain tacky at room temperature and vulcanize only at elevated temperatures are well known to those skilled in the art of rubber compounding.

An example of a stock satisfactory for the tacky outer face of the novel chafer strip is given below:

| | |
|---|---|
| Natural rubber | 100.00 |
| Carbon black | 50.00 |
| Softening oil | 6.00 |
| Zinc oxide | 10.00 |
| Antioxidant | 1.00 |

As would be expected, any conventional rubbery stock having little or no accelerator content yielding good tack for building into a tire will be satisfactory.

An example of stocks satisfactory for the rapid curing, nonflowable center layer of the chafer strip is:

| | |
|---|---|
| Natural rubber | 100.00 |
| Carbon black | 50.00 |
| Softening oil | 10.00 |
| Zinc oxide | 10.00 |
| Dibenzylamine | 4.00 |
| Dibutyl xanthogen disulfide | 4.00 |
| Sulfur | 4.00 |
| Antioxidant | 2.00 |

While an example has been given of a suitable fast-curing nonflowable rubbery stock satisfactory for the center layer of the chafer strip, the invention is not intended to be limited thereto but to any fast-curing rubbery material which will vulcanize to a nonflowable condition either in an oven at elevated temperature or in a short period of time at a room temperature of approximately 75° F. With the many accelerators available on the market, countless combinations of accelerators are available which will give a vulcanized rubber stock which will not flow under the temperature and pressure of vulcanization of the tire.

The invention is not intended to be limited to fast-curing natural rubber stocks in the center of the chafer strip nor, in fact, to rubbery stocks themselves since any hard abrasion resistant material which will adhere to the outer tacky layer to make possible the building of the strip into the tire will be satisfactory in the invention. Suitable modifications including center layers comprised of synthetic rubbers such as rubbery abrasion resistant polymers of chlorobutadiene, rubbery polymers of acrylinitrile-butadiene, rubbery copolymers of butadiene-styrene and even rubbery copolymers of polyisobutylene and isoprene. These rubbery materials may be used individually or as blends, the chief requirement being that they are in a nonflowable condition at the time they are placed with the tire in the tire vulcanizing mold.

Obviously, any combination of non-cured or semi-cured rubbery materials such as the copolymers listed above as well as certain tacky plastics, are usable in the tacky outer layer of the novel strip. The chief requirements of the outer layers of the novel strip, of course, being a tacky surface sufficient to adhere the novel strip to the bead area of the unvulcanized tire during tire building as well as adhesive compatibility with the bead of the tire after vulcanization. With the wide range of rubbery and plastic materials as well as oils and softeners commercially available, it is obvious that a great number of combinations are possible for the outer tacky surfaces. The invention resides in a combination of a stiff nonflowable center layer or layers with the outer tacky layers which are adhesively compatible with the unvulcanized tire bead regardless of the constituents in any of the layers with the requirement also that the strip in the vulcanized tire must have sufficient abrasion resistance to resist the rubbing of the rim flange.

The rubbery stocks of the layers of the novel strip may be mixed in any conventional manner. For example, the rapidly vulcanizing center strip may be prepared by mixing the rubbery constituents and modifying pigments together on a two roll mixing mill with the careful addition of the softening oils, if any, and then final addition of curing ingredients such as sulfur and accelerator. It is also possible to master batch the rubbery material of the fast-curing center section with some of the pigments; remove the master batch mix from the banbury or mill in which or on which it has been mixed; allow the masterbatch to cool; rework the master batch on suitable rubber working machinery and add the curing ingredients such as sulfur and accelerators. Yet, another way of mixing the rapidly vulcanizing center layer of the novel strip especially when two types of accelerator are used one in each center layer 23 and 24 is to mix for example on a mill one batch of the rubbery material containing one of the accelerators and another batch of the rubbery material containing the other of the accelerators keeping the two stocks separate until the forming operation such as calendering and then combining the two stocks containing the two accelerators on the warm up mill before the forming operation. This is particularly desirable if the accelerators are extremely fast in cure rate since very little time elapses between the warm up of the stock and the forming operation, calendering, tubing or otherwise. In this manner, the stock is formed before the center portion becomes stiff and unworkable due to the fast action of the accelerator, yet, the fast accelerator is available to stiffen up the center layer of the novel strip immediately after the strip is formed.

Examples of stocks which have different accelerators but which when combined are satisfactory for use in the invention are:

| | Stock A | Stock B |
|---|---|---|
| Natural Rubber | 100.00 | 100.00 |
| Carbon Black | 50.00 | 50.00 |
| Softening Oil | 6.00 | 6.00 |
| Zinc Oxide | 10.00 | 10.00 |
| Dibenzylamine | 4.00 | |
| Dibutyl xanthogen disulfide | | 4.00 |
| Sulfur | 4.00 | |
| Antioxidant | 1.00 | 1.00 |
| | 175.00 | 171.00 |

Although several modifications of the invention have been set forth, it is not intended that the invention be limited to the modifications shown but those skilled in the art will see that other possible modifications exist. The present invention is limited only by the state of the existing art in the light of the following claims:

I claim:

1. A tubeless tire comprised of an open bellied vulcanized rubberized fabric body portion terminating at its edges in two inextensible hoop shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer surfaces thereof by chafer elements comprised of at least two layers of rubbery material, one said layer of each chafer comprised of a vulcanized rubbery polymer which has been stiffened to a substantially nonflowable state by a first vulcanization before application to the bead of the unvulcanized tire and which has received a second vulcanization as said tire is molded and vulcanized and another layer of each chafer comprised of a rubbery polymer which is in a soft tacky state after said first vulcanization adhered in face to face relation with the rubberized fabric body portion at each bead of said tire.

2. A tubeless tire comprised of an open bellied vulcanized rubberized fabric body portion terminating at its edges in two inextensible hoop shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer surfaces thereof by chafer elements comprised of at least two layers of rubbery material, one said layer of each chafer comprised of vulcanized natural rubber which has been stiffened to a substantially nonflowable state by a first vulcanization before application to the bead of the unvulcanized tire and which has received a second vulcanization as said tire is molded and vulcanized, and another layer of each chafer comprised of a rubbery polymer which is in a soft tacky state after said first vulcanization adhered in face to face relation with the rubberized fabric body portion at each bead of said tire.

3. A tubeless tire comprised of an open bellied vulcanized rubberized fabric body portion terminating at its edges in two inextensible hoop shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer surfaces thereof by chafer elements comprised of at least two layers of rubbery material, one said layer of each chafer comprised of a vulcanized rubbery copolymer of butadiene and styrene which has been stiffened to a substantially nonflowable state by a first vulcanization before application to the bead of the unvulcanized tire and which has received a second vulcanization as said tire is molded and vulcanized, and another layer of each chafer comprised of a rubbery polymer which is in a soft tacky state after said first vulcanization adhered in face to face relation with the rubberized fabric body portion at each bead of said tire.

4. A tubeless tire comprised of an open bellied vulcanized rubberized fabric body portion terminating at its edges in two inextensible hoop shaped beads, said body portion having superimposed thereon a vulcanized rubbery tread portion, a substantially air impervious vulcanized rubbery liner adhered to the belly of said tire from bead to bead, said inextensible bead portions covered over at least part of the radially inner and axially outer surfaces thereof by chafer elements comprised of at least two layers of rubbery material, one said layer of each chafer comprised of a vulcanized rubbery copolymer of butadiene and acrylonitrile which has been stiffened to a substantially nonflowable state by a first vulcanization before application to the bead of the unvulcanized tire and which has received a second vulcanization as said tire is molded and vulcanized, and another layer of each chafer comprised of a rubbery polymer which is in a soft tacky state after said first vulcanization adhered in face to face relation with the rubberized fabric body portion at each bead of said tire.

5. A method of making a tire comprising in combination the steps of preparing a laminated toe strip comprising an interior layer of low-temperature activated vulcanizable rubber stock and exterior surface layers on each side of said interior layer, such surface layers being made of less readily vulcanizable stock, subjecting the said laminated toe strip to vulcanizing conditions sufficient to vulcanize said interior layer but insufficient to vulcanize the exterior surfaces of the laminate, building a raw tire carcass in band form on a tire building drum, applying the laminated toe strip to the bead areas of the tire carcass, and subsequently shaping and curing the tire casing in a mold.

References Cited in the file of this patent

UNITED STATES PATENTS

| | | |
|---|---|---|
| 2,592,844 | Antonson | Apr. 15, 1952 |
| 2,625,980 | Castricum | Jan. 20, 1953 |
| 2,625,981 | Wallace | Jan. 20, 1953 |
| 2,645,265 | O'Neil | July 14, 1953 |
| 2,649,134 | Steinle | Aug. 18, 1953 |
| 2,698,042 | Perkins | Dec. 28, 1954 |
| 2,713,382 | Bosomworth et al. | July 19, 1955 |
| 2,822,026 | Willis | Feb. 4, 1958 |